(12) United States Patent
Bost

(10) Patent No.: US 11,297,817 B2
(45) Date of Patent: Apr. 12, 2022

(54) PEST CONTROL METHOD USING ADHESIVE TRAP

(71) Applicant: Tony Bost, Sumner, TX (US)

(72) Inventor: Tony Bost, Sumner, TX (US)

(73) Assignee: ROYALTIES OF ROYALTY, LLC, Paris, TX (US)

( * ) Notice: Subject to any disclaimer, the term of this patent is extended or adjusted under 35 U.S.C. 154(b) by 97 days.

(21) Appl. No.: 16/875,399

(22) Filed: May 15, 2020

(65) Prior Publication Data

US 2021/0037804 A1    Feb. 11, 2021

Related U.S. Application Data

(63) Continuation-in-part of application No. 16/775,220, filed on Jan. 28, 2020, which is a continuation-in-part of application No. 16/533,762, filed on Aug. 6, 2019, now Pat. No. 10,674,716.

(51) Int. Cl.
| | |
|---|---|
| *A01M 1/14* | (2006.01) |
| *A01M 1/10* | (2006.01) |
| *B32B 7/12* | (2006.01) |
| *A01M 1/16* | (2006.01) |
| *B32B 7/022* | (2019.01) |

(52) U.S. Cl.
CPC ............ *A01M 1/14* (2013.01); *A01M 1/10* (2013.01); *A01M 1/16* (2013.01); *A01M 1/165* (2013.01); *B32B 7/022* (2019.01); *B32B 7/12* (2013.01); *B32B 2405/00* (2013.01)

(58) Field of Classification Search
CPC ............ A01M 1/10; A01M 1/14; A01M 1/16; A01M 1/165; B32B 7/022; B32B 7/12; B32B 2405/00

USPC ........................................................ 43/114
See application file for complete search history.

(56) References Cited

U.S. PATENT DOCUMENTS

| | | | | |
|---|---|---|---|---|
| 552,792 | A * | 1/1896 | Stolz | A01M 1/14 43/114 |
| 675,338 | A * | 5/1901 | Nobbs | A01M 1/14 43/114 |
| 919,507 | A * | 4/1909 | Wiegand | A01M 1/14 43/114 |
| 1,480,539 | A * | 1/1924 | Grecu | A01M 1/16 43/114 |
| 4,959,924 | A * | 10/1990 | Martin | A01M 1/14 43/114 |

(Continued)

*Primary Examiner* — Brady W Frazier
(74) *Attorney, Agent, or Firm* — Law Office of Jeff Williams PLLC; J. Oliver Williams

(57) ABSTRACT

A pest trap assembly and method of use includes the obtaining of a trap assembly and the selective modification of the structure to produce one or more functional traps. As a structure, the trap assembly includes a relatively flat structure having an adhesive layer across one surface and a film cover over the top of the adhesive layer. A user may use the whole structure as a glue trap or may elect to break it up into different independent sections. Perforated lines are provided to aid in separation. A user may elect to build a three-dimensional structure defining an interior volume from the structure. The configuration may be that of conical or of a pod where the interior volume is defined by a plurality of sides. These configurations aid in capturing air born pests or pests hiding on lower surfaces and are designed to be hung or suspended.

18 Claims, 14 Drawing Sheets

(56) References Cited

U.S. PATENT DOCUMENTS

| | | | | |
|---|---|---|---|---|
| 5,572,825 A | * | 11/1996 | Gehret | A01M 1/02 229/120.11 |
| 2006/0283075 A1 | * | 12/2006 | Feldhege | A01M 1/02 43/114 |
| 2009/0183419 A1 | * | 7/2009 | Harris | A01M 1/14 43/114 |
| 2012/0110893 A1 | * | 5/2012 | Fabry | A01M 1/14 43/114 |
| 2017/0223944 A1 | * | 8/2017 | Bost | A01M 1/103 |

\* cited by examiner

PEST CONTROL METHOD USING ADHESIVE TRAP

CROSS REFERENCE TO RELATED APPLICATIONS

This application is a continuation-in-part of and claims the benefit of and right of priority to U.S. application Ser. No. 16/775,220, filed 28 Jan. 2020, which claims priority to U.S. application Ser. No. 16/533,762, filed 6 Aug. 2019, the contents of which are incorporated by reference herein in its entirety.

BACKGROUND OF THE INVENTION

1. Field of the Invention

The present application relates to a device and method of capturing insects, and more particularly to a device configured to facilitate a plurality of different manners and methods for attracting and capturing assorted insects.

2. Description of Related Art

It is highly undesirable to tolerate the presence of insects within a home or dwelling, whether it be a commercial or residential dwelling. Insects can carry diseases and are generally unhealthy for human and pet exposure. Millions of dollars each year is spent on the treatment and eradication of insects from dwellings. Typically sprays are used or assorted traps. The sprays are generally applied along the baseboard and are used to help prevent the entrance of insects into the home. Powders may also be used similarly to that of sprays. The powders can be applied around plumbing spaces, such as under the sinks. Traps are used to capture insects that have already entered the dwelling. These are laid on a surface and wait for the insect to pass inside and become trapped.

A considerable disadvantage of these conventional traps are that they are relatively flat and close to the ground. They rest on top of surfaces only. They are used primarily in one function and do not provide the user with any degree of flexibility to adjust the method of capture or placement of the trap, apart from choosing the flat surface to rest it on. Although these types of devices and treatment methods have some effect, none appear able to handle insects that remain in the upper portions of the dwellings. Additionally, all these methods fail to provide the user with options and flexibility in the manner of trap placement and its location.

For example, spiders typically stay away from the lower levels of the home and can be found around the ceiling. Insects (especially spiders) are intensely attracted to corners during their hunt for other insects and a place of desired living. The spiders that go into corners do so mainly because of the webbing techniques due to the various angles, the darker shadows which are typically found in corners yielding privacy, and the heat factor (more relative to corners near ceilings) where the spiders find for suitable as well as other insects which they can expect to travel to these corners also.

However, none of the traps and spray treatment methods described adequately address the presence and deterrence of insects in the upper corners of the dwellings, along runs on a surface, all while facilitating the ability for the user to construct a trap tailored to his/her needs. Although some strides have been made with respect to pest control methods, considerable shortcomings remain.

BRIEF SUMMARY OF THE INVENTION

The trap assembly of the present application includes a modular relatively planar structure that is configured to be adaptable for different methods and configurations to capture insects, spiders and pests in general. The assembly includes a modular structure having a main body with a first face and a second face. The main body consists of a plurality of detachable sections. An adhesive layer extends across a portion of the second face of the modular structure. A detachable film cover lays across the adhesive layer to permit handling without contact of the adhesive layer. In one configuration the modular structure may be used as a singular flat trap with an adhesive. In another configuration a user may separate the different portions of the main body and use each as a distinct and separate flat trap. The film cover over the adhesive layer is removable and the modular structure, whole or in sections, may be laid along a surface with the adhesive layer facing upward to capture passing pests and insects.

An object of the present application is to provide a singular trap assembly that is capable of attachment to corners of a room in both elevated positions and along a lower surface. The assembly is configured to allow pests and insects to pass through an optionally available aperture within the main body and/or to permit them to pass through one or more sides of the modular structure when set up. The shape of the main body section is ideally triangular to permit close contact around the edges of the main body within the corners. This portion of the main body may also include tabs or wings along any of its edges. The trap assembly may include multiple fold lines and detachable lines to allow neighboring corners to be removed. Additionally, the use of multiple fold flaps may be folded toward one another and contact along a flap edge.

An additional use of the trap assembly of the present application is the ability to use the main body to construct different shaped structures suited for the capture of pests. These structures allow for the trap to be located along bottom surfaces, hanging from one or more surfaces, and areas that do not suit mere resting on a horizontal surface. The methods of constructing the structures typically involve the folding of corners in the main body toward the center of the main body and adhering them together with the adhesive.

In one embodiment, two corners are overlapped above the second surface and the adhesive is used to stick them together. The remaining corner may be used to adhere the main body in an elevated position. For example to an underside of a desk. The third corner may also be folded over to create a pod with a plurality of holes about the side edges. A hole in the main body may optionally be removed and used to adhere the pod structure in an elevated position as well.

Use of the trap assembly of the present application permits a user a plurality of options when endeavoring to capture and regulate pests. The user merely elects the type of method between the use of a flat trap or an enclosed trap, and the location of the trap to determine the method needed.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
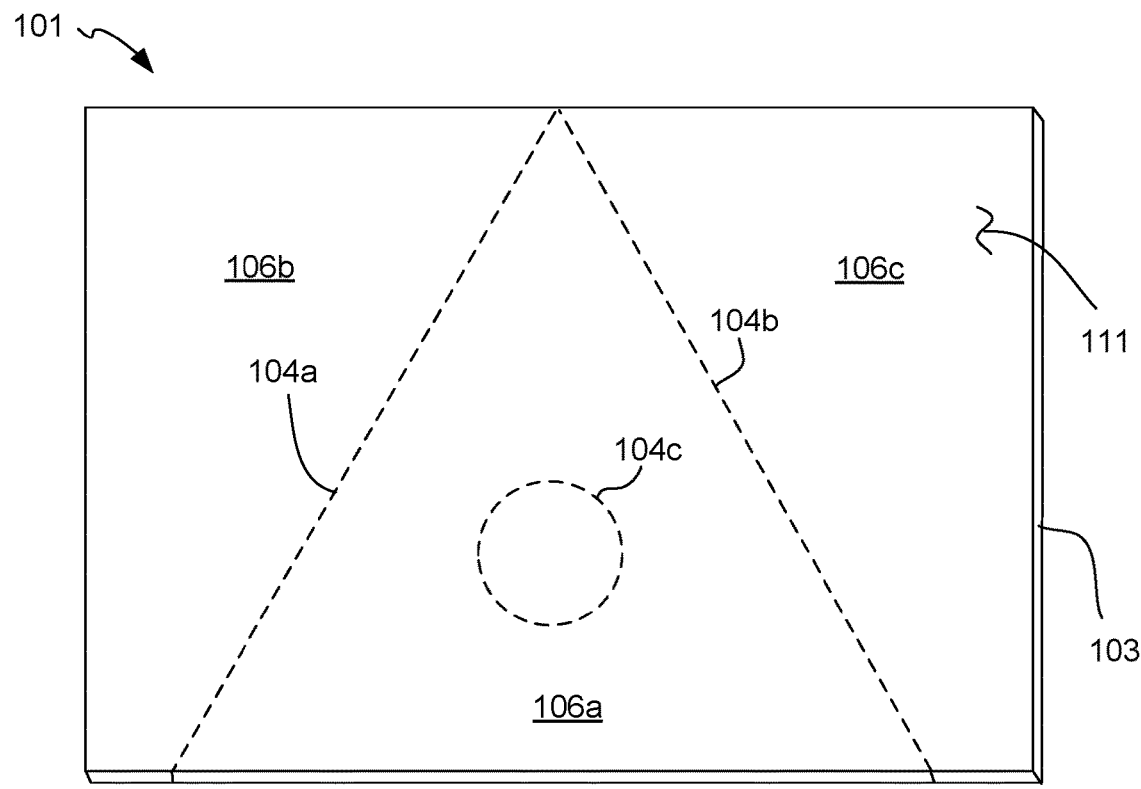
FIGS. 1 and 2 are front and rear views of a trap assembly according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. In particular, the trap assembly of the present application provides a user with functional capability to modify the trap so as to formulate a plurality of different configurations and methods of capturing pests. The trap assembly provides a modular trap system for use in homes and businesses which allows the consumer the ability to create different manners of traps. These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The trap assembly of the present application is configured to provide a user a means of capturing one or more pests including spiders, insects, rodents and other creatures (herein referred to collectively as "pests") for different surfaces and in different methods. The trap assembly is a configurable in an unlimited number of different ways but for purposes herein, at least five configurations and uses will be described to illustrate various functions. Such functions and features will be centered around the use of an adhesive layer placed on a material. The adhesive layer is used to capture the pests.

It is worth noting that a method of attracting the pests to come into contact with the assembly is also conceived as the assembly may include a pheromone or other type of baiting technique to lure such pests into contact with the adhesive layer therein and become trapped.

Typical places for use of the assembly are closets, attics, bedrooms, kitchens, living rooms, bathrooms, and other rooms where pests will be attracted. This may include runs along surface tops and in the corners (especially near the ceilings). These locations are appealing for pests for many reasons, such as visibility of all surroundings for a sense of security, webbing techniques, shadowed areas, and warmer climates which naturally lure the pests (especially spiders) to these corners. The device may be placed into corners or along surfaces and left alone until the user decides to either remove the device at their convenience to dispose of any entrapped pests. The device may then be replaced and/or the user merely sets up the assembly in a new area. The goal is to provide a user the ability to maintain greater control over the pests from ever gathering into corners or along surfaces in a structure again. In some configurations, the assembly may be partially suspended from a surface.

Before delving into a description of the assembly, it is understood that the modular structure may include stylistic indicia along any face. The indicia may be useful to convey messages to a user or to blend the modular structure assembly with the various interior designs of businesses, homes, schools, and other places for the appreciated usage of the device.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIGS. 1-4 in the drawings, a trap assembly 101 is illustrated. Trap assembly 101 includes a modular relatively planar structure 103, an adhesive layer 105, and a detachable film cover 107. Structure 103 has adhesive layer 105 along at least one face or side. Cover 107 is configured to lay over adhesive layer 105. Perforations or tear points are located to help in separating trap assembly 101 into one or more sections by a user. The perforation lines may be at any location and help to form any shape. Cover 107 also may include matching perforation lines to coincide with those in structure 103, however cover 107 may also include more or fewer perforation lines. For example, cover 107 may include additional perforation lines distinct from that of those in structure 103. FIGS. 1-4 will illustrate an example of trap assembly 101.

Figure 2:
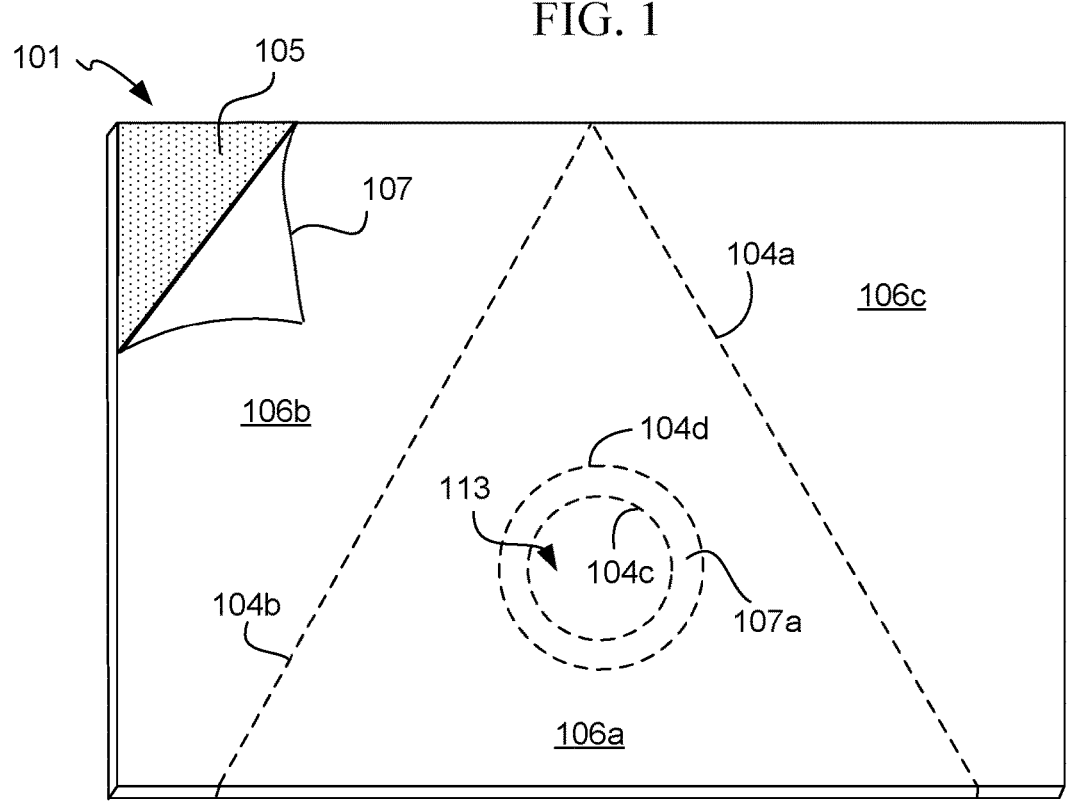
Figure 3:
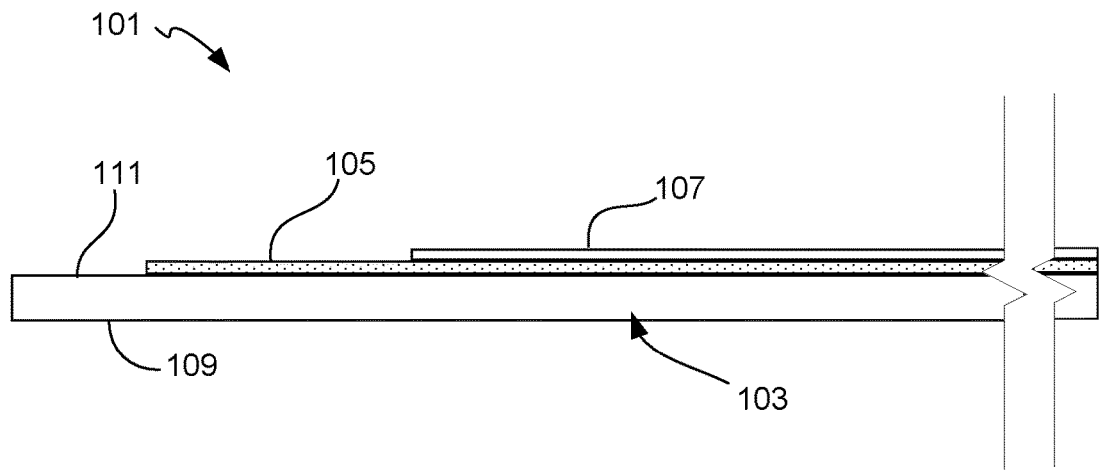
FIG. 3 is an enlarged side view of the trap assembly of FIGS. 1 and 2.

As seen in FIGS. 1-4, structure 103 has a first face 109 and a second face 111 (see FIG. 3). In FIG. 1, a front view of trap assembly 101 is shown. Face 109 is visible as well as one or more perforation lines 104a-c. Structure 103 is selectively separable into any number of a plurality of sections. A first section is a main body section 106a. Other sections may include sections 106b and 106c. Any number of sections are possible. Three sections are shown here for illustrative purposes only and are not meant to be limiting.

Lines 104a-c are used to assist in designating the one or more sections of structure 103 and that of trap assembly 101. Corresponding perforation lines are provided through layer 105 and cover 107. This aids in allowing the user to separate the sections of trap assembly 101 as a whole prior to removing cover 107.

As seen in FIG. 2, a rear view of trap assembly 101 is provided. Adhesive layer 105 is located across a portion of second face 111 (see FIG. 3). For purposes herein, layer 105 extends across the entire face 111. Cover 107 is overlaid across portions of layer 105 to provide protection and restrict unintentional sticking to layer 105. Layer 105 may be laid across any amount of second face 111 as desired. Likewise, cover 107 may extend over any portion of structure 103 whether covered in layer 105 or not. It is assumed cover 107 will at least cover the portions of layer 105, although not required. For purposes herein, cover 107 extends across all of layer 105 and face 111. Any portion of cover 107 may be removed by the user at any time.

As stated previously, it should be known that cover 107 may include matching perforation lines with those found in structure 103. Cover 107 may also include perforation lines unique only to that of cover 107 and not be in conjunction with a similar perforation line in structure 103. This is seen clearly in FIGS. 2 and 4. Perforation line 104d does not include a corresponding perforation in structure 103. This allows portions of cover 107 to be able to be removed independent of individually defined sections of structure 103. In the example depicted, a user may remove the portion of cover 107 between line 104c and line 104d (i.e. detachable film cover 107a) apart from the rest of cover 107, or vice versa. This also lets only portions of the sections of structure 103 and layer 105 to be exposed as opposed to the entire section 106a-c. It is understood that cover 107a is a representative example of an independent perforation line 104d and is not meant to be limiting.

Referring in particular to FIG. 3, a side view of trap assembly 101 is illustrated. In this view, faces 109 and 111 are more clearly visible. Portions of layer 105 and 107 have been pulled back to assist in illustrating the parts of trap assembly 101. Layer 105 is in communication with face 111. Cover 107 (and/or 107a or other portions of 107) are overlaid across sections of layer 105.

Figure 4:
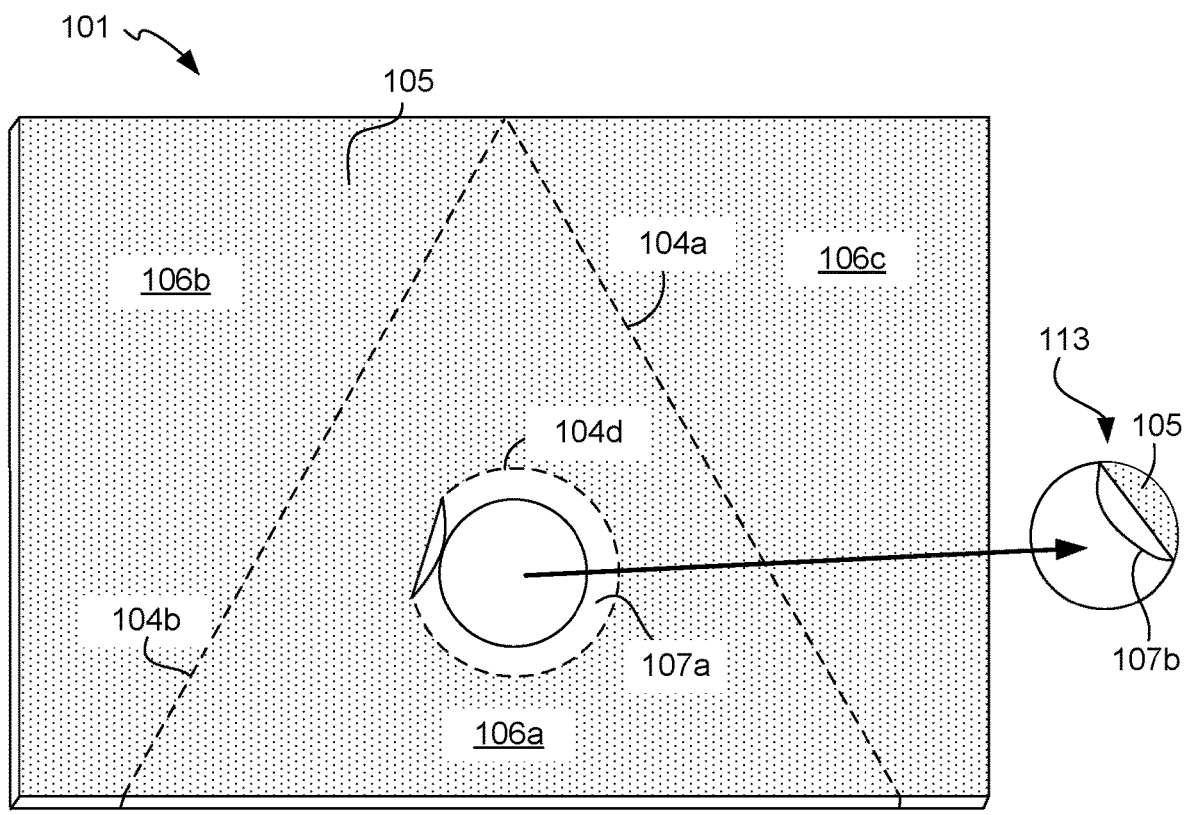
FIG. 4 is an alternate rear view of the trap assembly of FIG. 2.

Referring in particular to FIG. 4 in the drawings, an alternate rear view of trap assembly 101 is shown as compared to FIG. 2. In this Figure, cover 107 is removed apart from cover 107a. Cover 107a is partially folded back to show that perforation line 104d does not pass through structure 103 in this example.

Also of note is that assembly 101 includes optional hole members located anywhere within the edges of structure 103. Hole members may be represented in different ways in assembly 101. Hole members are configured to create an aperture or void section in structure 103 or any of its sections 106a-c. Hole members may therefore abut an edge of structure 103. In another example, a hole member may abut and/or share any portion of any perforation line. Hole members may be wholly within an interior area of structure 103. The means that it does not contact a defined outer edge of structure 103. Additionally the hole member may be configured to be within an interior area of any section of structure 103.

In the Figures it is seen that perforation line 104c is both through cover 107 and structure 103, thereby forming hole member 113. In FIG. 4, hole member 113 is removed independently from section 106a and or any other section. Cover 107 is further separated into an individual cover, namely cover 107b, that is situated over hole member 113. Adhesive layer 105 is also located across the second face, although it is understood that hole members may independently or optionally include layer 105 and/or cover 107.

The versatility of having independent perforation lines through cover 107 and structure 103 is visible. Cover 107 may be removed, while leaving cover 107a on layer 105. As will be discussed later, removing hole member 113 creates an aperture 115 for pests to pass though from face 109 to face 111. Leaving cover 107a around aperture 115 can allow pests to more fully enter or pass beyond aperture 115 prior to becoming trapped in layer 105. It is understood that cover 107 and any portion of layer 105 may alternatively be removed from any adjacent portion of hole member 113 or other type of hole member.

Figure 5:
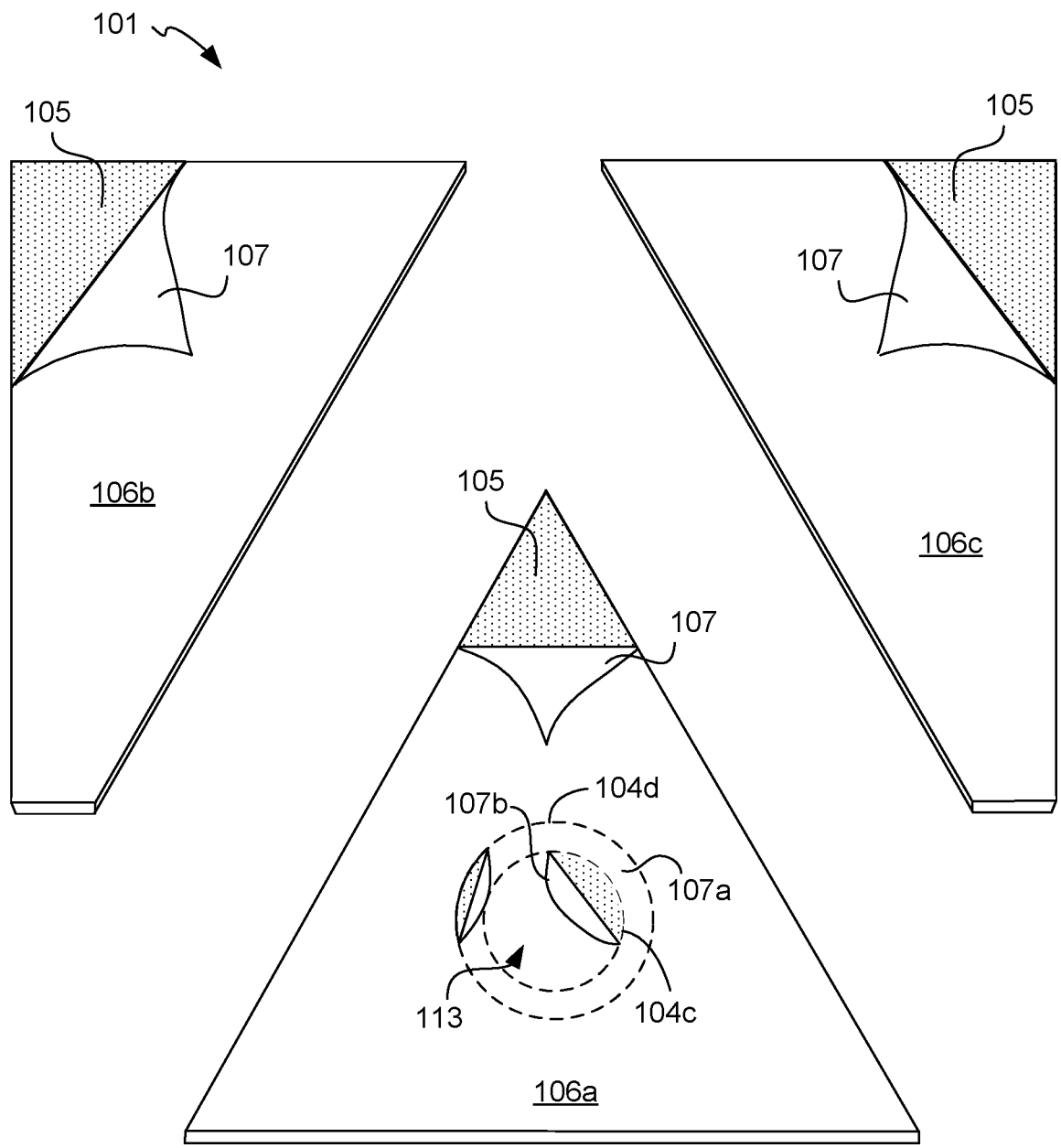
FIGS. 5 and 6 are exploded views of the trap assembly of FIGS. 1 and 2.
Figure 6:
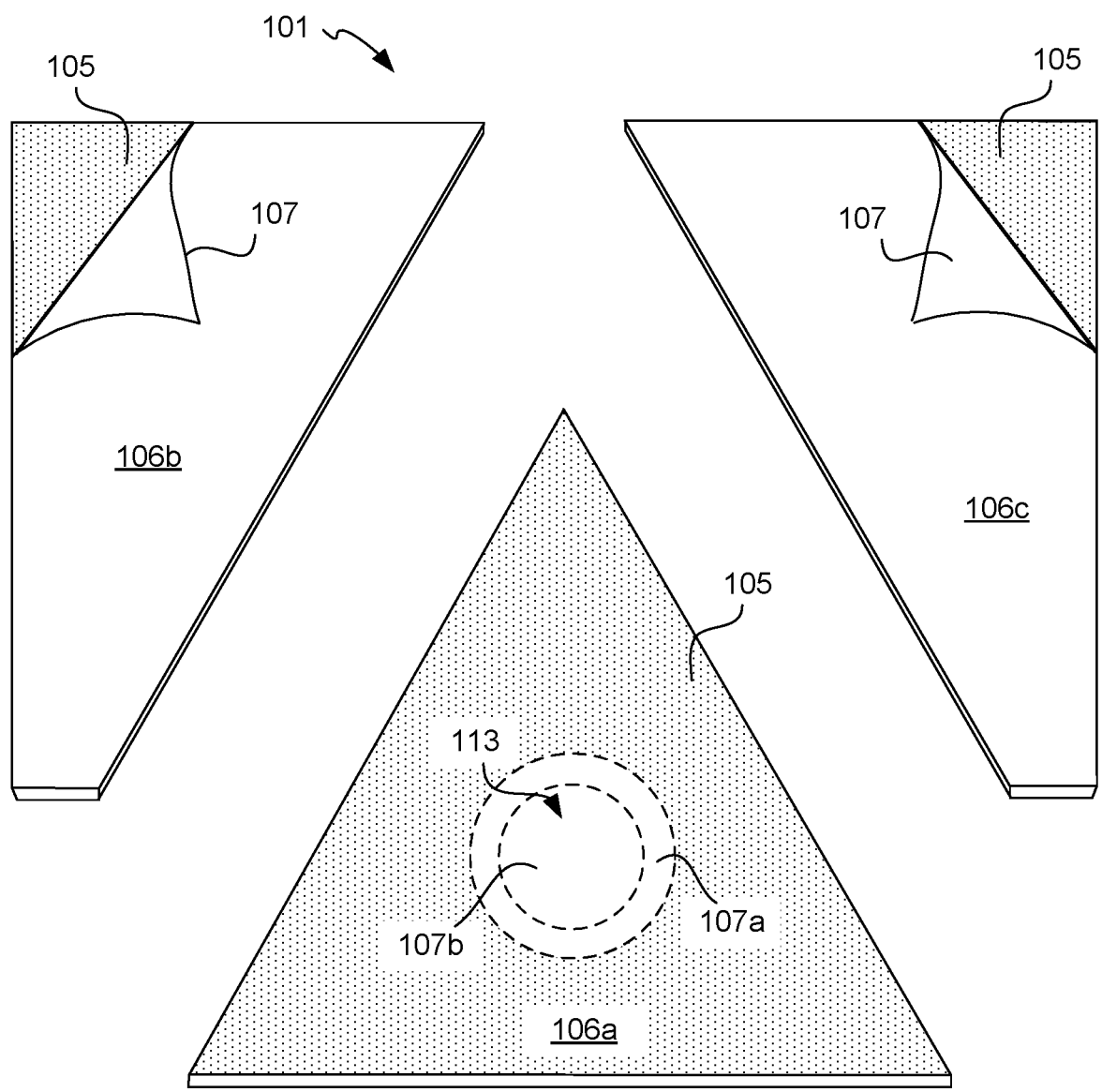

Referring now also to FIGS. 5 and 6 in the drawings, exploded views of trap assembly 101 are illustrated. Assembly 101 may be used by any user as a singular large glue trap wherein one or more portions of cover 107 are removed. Assembly 101 may then be located on a surface for a pest to come into contact. Examples of surfaces may be floors, shelves, or any relatively flat horizontal surface. In use a user first obtains a trap assembly having a first face and a second face. The second face has the adhesive layer. The user removes at least a portion of the detachable film cover from the adhesive layer and then locates the trap on a surface with the first face in contact therewith the surface.

In this first method of use for assembly 101, trap assembly 101 is retained in its whole singular form and the user peels away cover 107 from structure 103 before placing on the surface to trap various pests. Users may need to peel away separate portions of cover 107 in order to completely remove it. As seen in FIG. 6, hole member 113 is retained and cover 107b remains after removing the majority of cover 107. Covers 107a and/or 107b may be retained to serve as an optional grabbing spot to more easily handle the structure when placing the trap assembly. It is understood that covers 107a and/or 107b may optionally also be removed.

Alternatively, assembly 101 may be separated into independent sections (i.e. sections 106a-c) wherein each is usable as a flat glue trap with the individual covers removed. The user may follow the same steps previously but now also include the step of separating the trap assembly into a plurality of sections to allow the singular structure to be used in multiple locations. In this manner, a single flat glue trap is divisible to create multiple flat traps as needed or determined by the user. The act of separating assembly 101 into sections may occur by many methods. For example, a user may cut or rip assembly 101. In another example, the user separates structure 101 along the perforation lines. It is understood that the optional ability to remove or retain covers 107a and/or 107b remain in this method of use.

Figure 7:
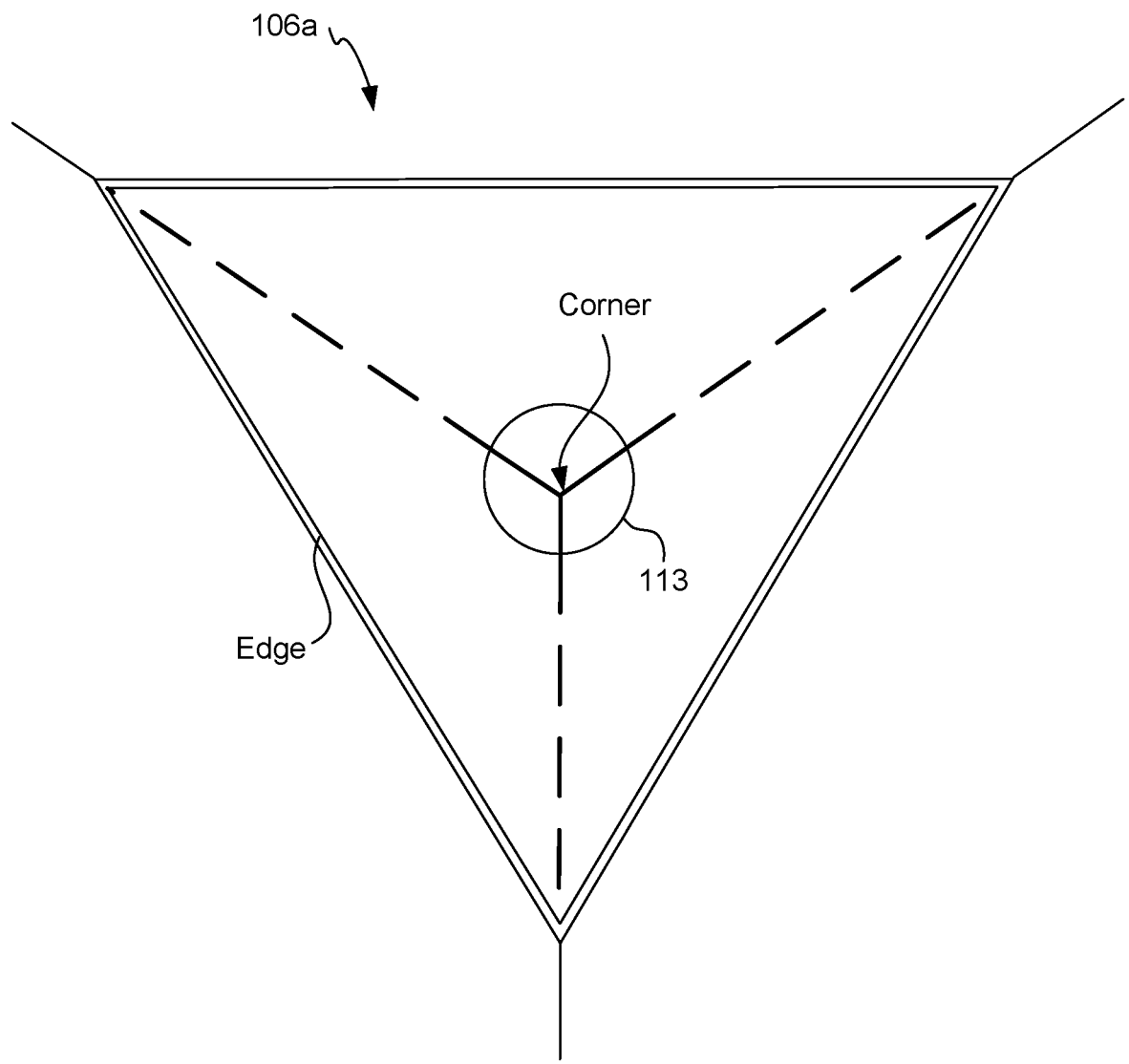
FIG. 7 is a perspective view of a main body of the trap assembly of FIGS. 1 and 2 spanning across a corner.

Referring now also to FIG. 7 in the drawings, a perspective view of section 106a is shown suspended in a corner. As noted previously, the different sections of assembly 101 may take many different forms. As seen in the Figures, section 106a is shaped in the form of a triangle, such as an equilateral triangle. FIG. 7 illustrates a third method of using assembly 101 to capture pests in different manners. Previously, the user was provided the ability to capture pests along a relatively horizontal surface using assembly 101 as only a flat trap. This was done by keeping it a singular large piece or by breaking up assembly 101 into separate sections.

FIG. 7 illustrates a method of using a section of assembly 101 to capture pests in by creating a void space with environmental structure.

The shape of a triangle allows section 106a to be located in a corner. The corner may include 3 or more adjoining surfaces. Typically, a room or structure has each surface at a relative perpendicular angle to the others. In this case a triangle suits the corner best. Section 106a may be shaped differently to account for different adjoining angles and or corners having 3+ adjoining surfaces. Section 106a may be withdrawn or separated from assembly 101 and used in the corner while leaving the other sections to serve as flat traps on the horizontal surfaces.

In use a user may take section 106a as seen in FIG. 6 and elect to apply it to a lower or upper corner as follows. The user may remove (gently press out) hole member 113 along with cover 107 to create an entry point. The user mounts this section 106a to a corner with layer 105 facing the corner. To mount section 106a, the user lines up each of the tips of the triangular section with each of the three edges that form a corner. When properly mounted a void space is created between the corner and face 111 or layer 105 where pests seek to hide by entering through aperture 115 when hole member 113 is removed. Cover 107a may be optionally retained to allow pests to enter further into the void space prior to contacting layer 105. It is understood that section 106a may be formed in different ways wherein its edges are not linear for example. In some examples, the edges may be notched to allow selective entrance through an edge as oppose to, or in combination with, aperture 115. The notch or aperture 115 are entry points for pests to enter the void space. Conversely an edge of section 106a may include a tab that could be folded inward into the void area to assist in adhering section 106a into the corner. It is desired that the corner be covered to create the void space and that at least one entrance (entry point) be permitted to allow pests to pass from face 109 to face 111. The illustrated example is just one method.

When removing section 106a, the user simply presses against a portion of face 109 to allow an edge of section 106a to bend outwards. The user may grab and use that edge for removing. It is not intended that a user would insert a part of their body into the void pace. Section 106a may then be disposed of. Keep in mind that the user can use the other section(s) of assembly 101 to place along other surfaces to capture pests.

Figure 8:
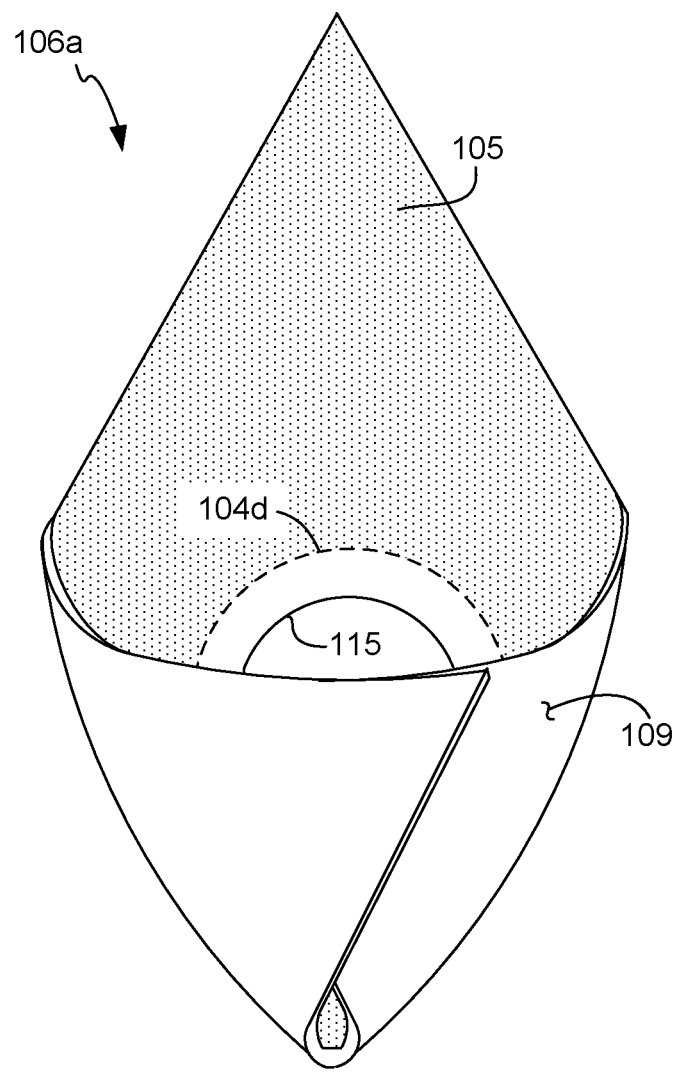
FIG. 8 is a front view of the trap assembly of FIG. 1 formed into a conical shape.
Figure 9:
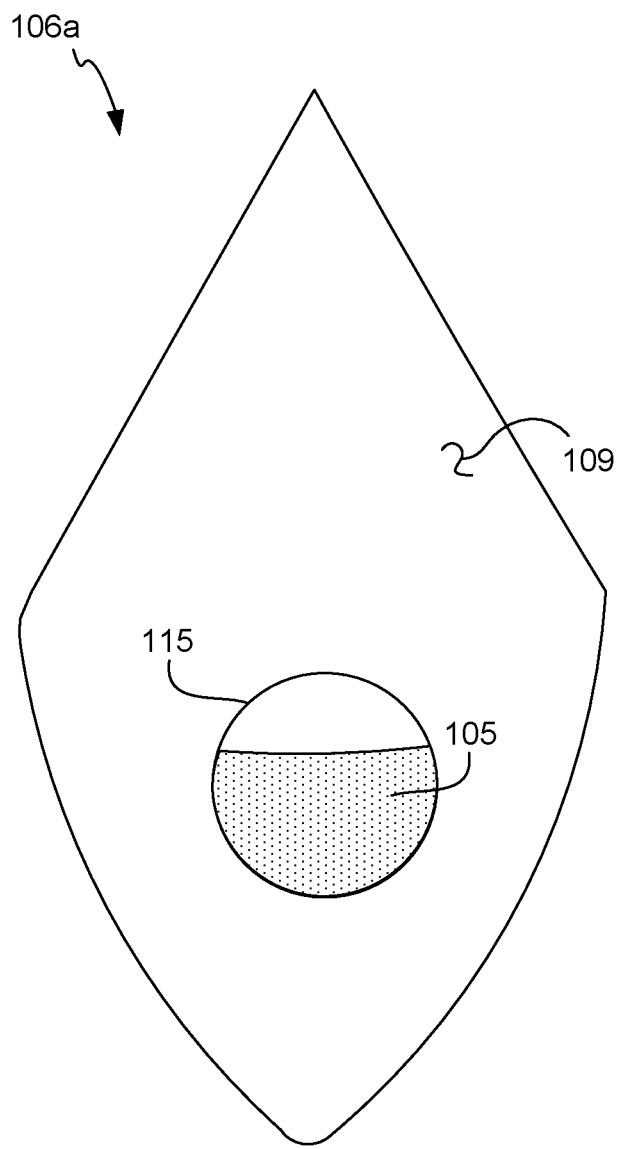
FIG. 9 is a rear view of the trap assembly of FIG. 8.
Figure 10:
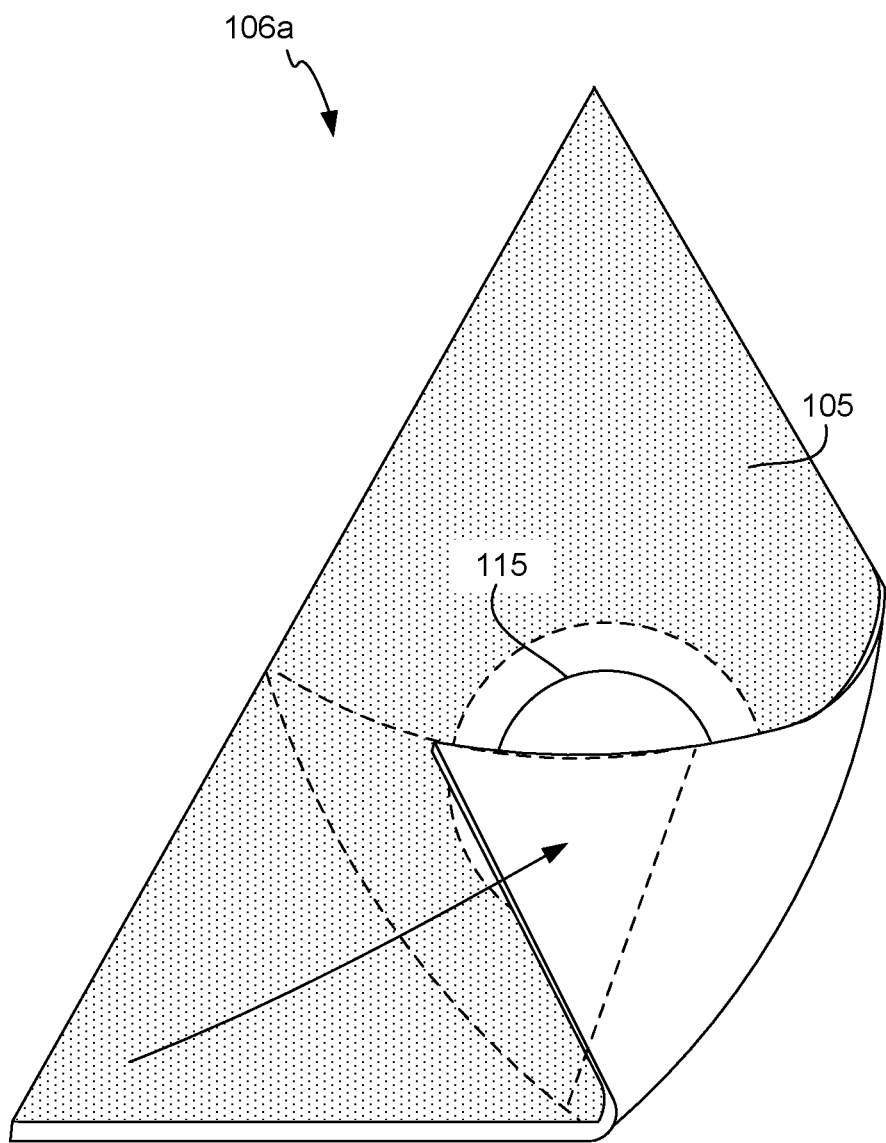
FIGS. 10 and 11 illustrate steps to manipulate the trap assembly of FIG. 1 to produce the trap assembly configuration of FIG. 8.

Referring now also to FIGS. 8-12 in the drawings, views of section 106a is illustrated as manipulated into a different configuration for a different method of use. A user may elect to take the entire body of assembly 101 and/or any section thereof to manipulate it to form a body shape defining an interior volume within itself. As seen in FIGS. 8 and 9 for example, section 106a is used to form a 3-dimensional body having an interior volume.

Figure 11:
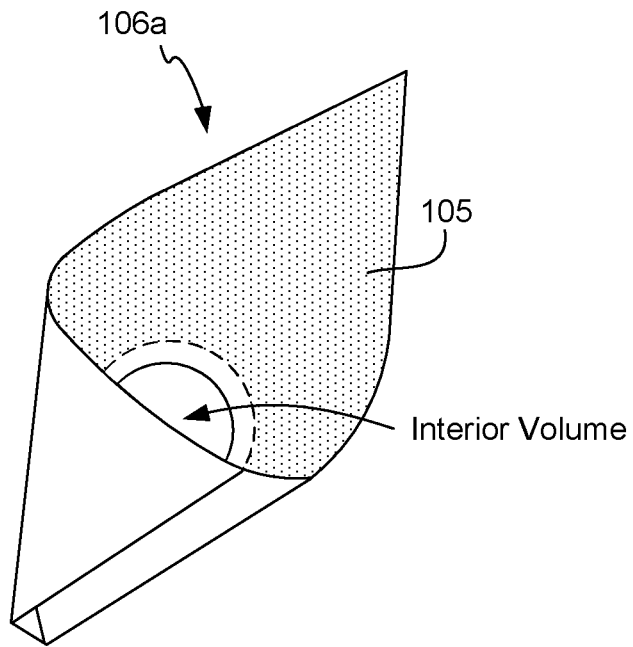
Figure 12:
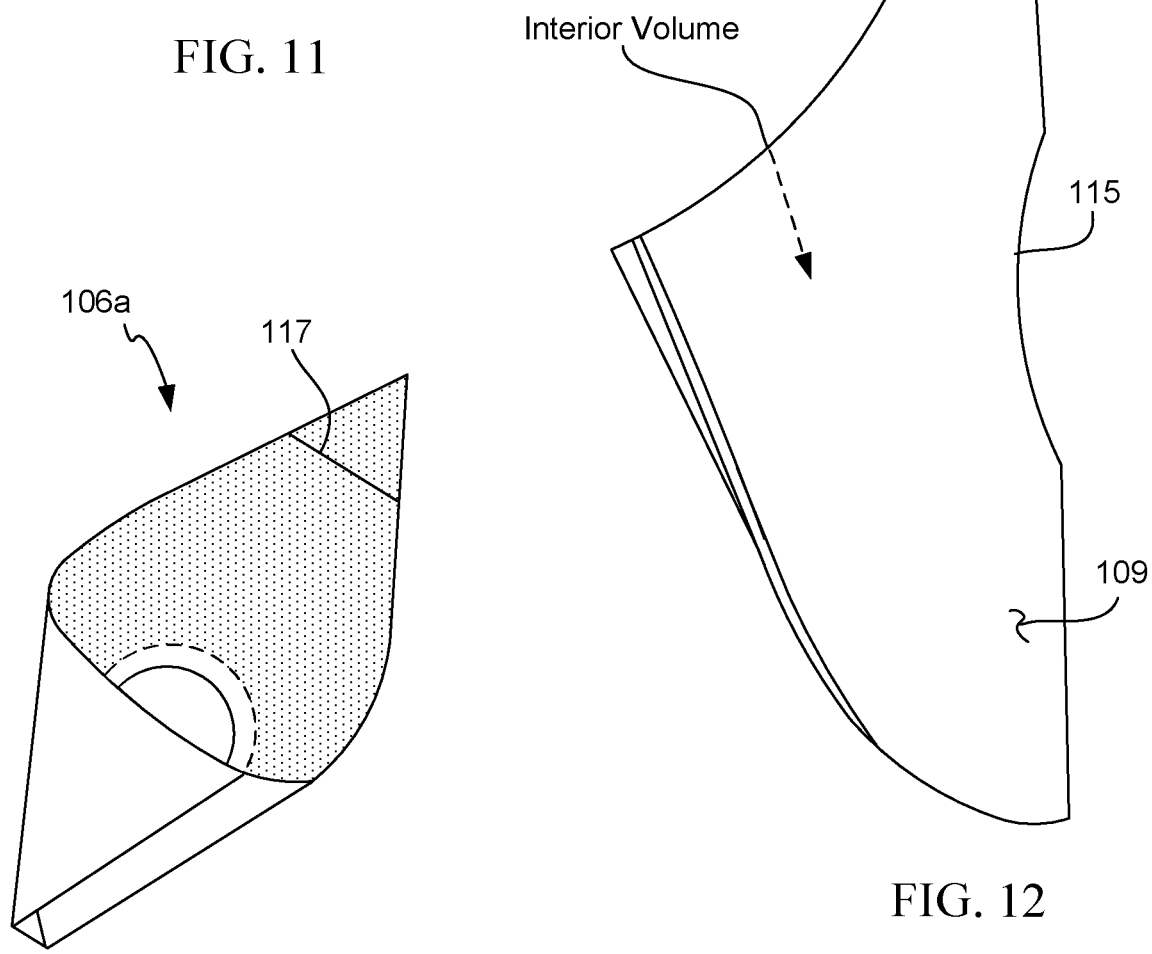
FIG. 12 is a side view of the trap assembly of FIG. 8.

In FIGS. 8 and 9, section 106a is shown to form a conical shape wherein corners (or portions of the edge) are overlapped so as to use layer 105 from one corner to adhere to surface 109 on the other corner. The first corner is illustrated in a folded over position in FIG. 10. The second corner is next to be folded over as indicated by the arrow. The interior volume is defined as the area within the conical shape as seen in FIGS. 11 and 12. Layer 105 is facing the interior of the conical shape in this embodiment. It is understood that portions of layer 105 may face outward from the conical shape in other embodiments.

Hole member 113 may be optionally removed, and cover 107a may also be optionally removed. Aperture 115 creates a point of entry into the interior volume. However, a point of entry is also created from the mere shape of the conical form wherein pests may enter at the widest point. A hole member may be formed anywhere about the conical shape.

In use, a user may grab any two portions of the section/structure and roll them (inwards) together to overlap and stick the two sides together. The adhesive layer from the trap will bond each sides together. The trap appears like a cone or funnel when currently connected. The user may then mount this form of section 106a to an elevated surface so as to hang the conical area from such surface.

Figure 13:
FIG. 13 is an alternate perspective view of the trap assembly of FIG. 11.
Figure 14:
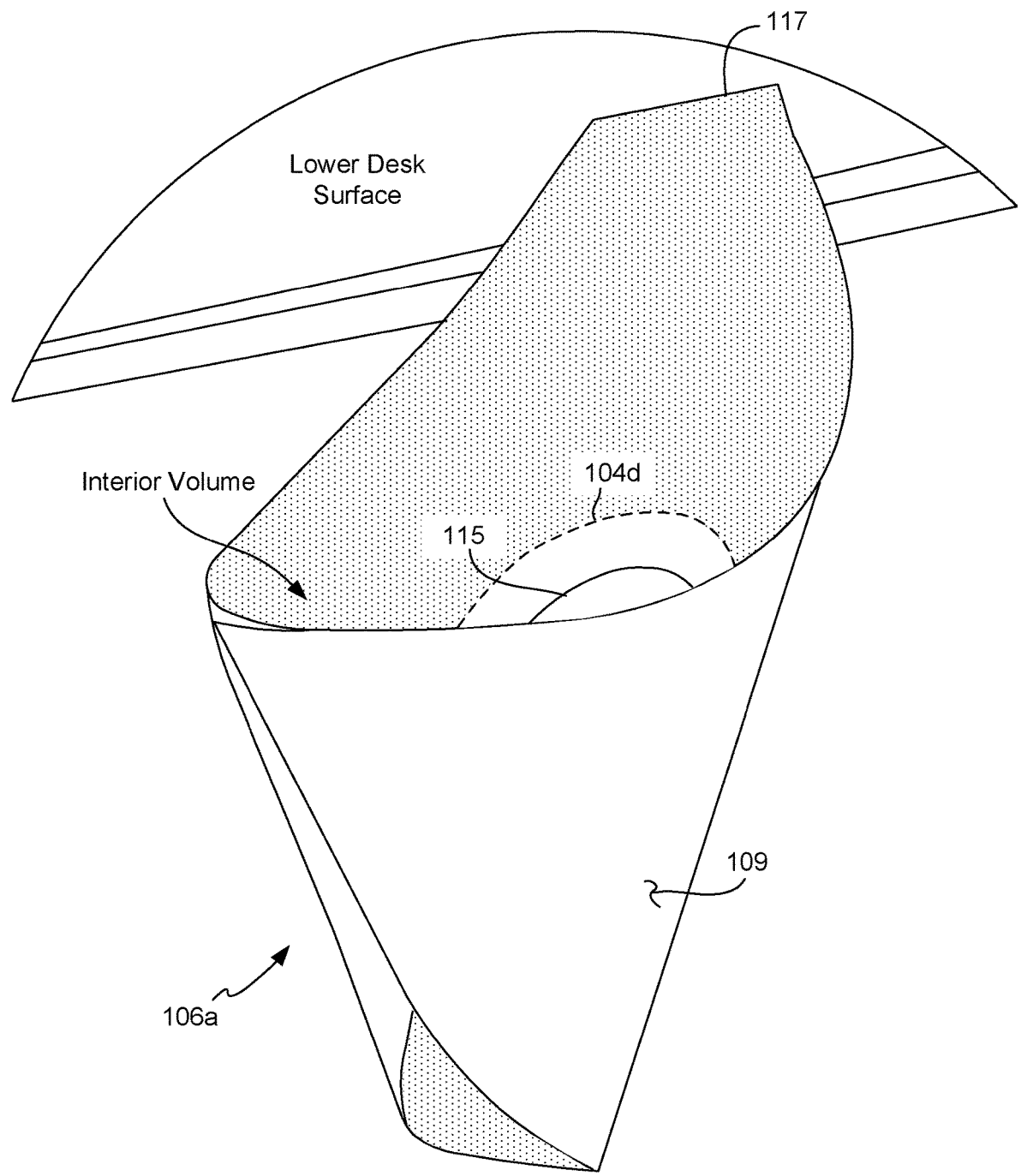
FIG. 14 is a perspective view of the trap assembly of FIG. 13 supported from a desk.

Referring now also to FIGS. 13 and 14 in the drawings, secondary views of section 106a is shown in the conical form. A user may elect to fold back a portion of itself (typically the non-overlapped portion) to orient a portion of the adhesive layer 105 upwards. This may be done by creating a fold line 117 such that about 1 inch of the tip of the corner is bent backwards for example (see FIG. 14). After folding about line 117, this portion may be used to mount section 106a/structure 103 to almost any upper area. This may be mounted from a door frame, window frame, a desk, or any other elevated surface. Using a portion of assembly 101 in this manner allows the user to monitor and trap more flying insects such as mosquitos, various flies, moths, gnats and other pests. As always, other sections of assembly 101 not used in the conical shape may continue to be used in a flat configuration.

Figure 15:
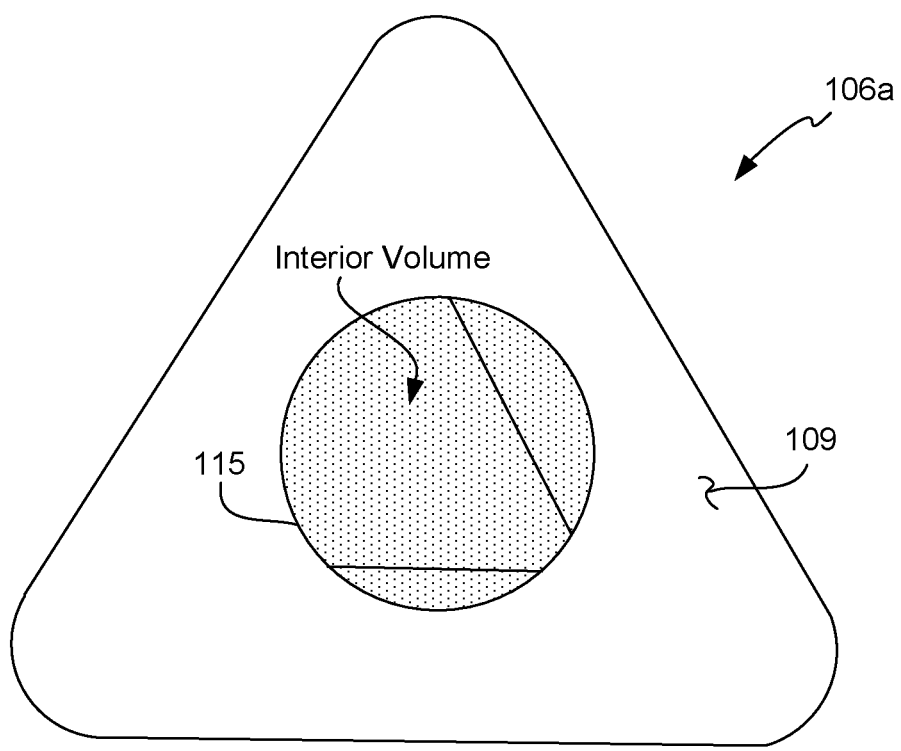
FIG. 15 is a front view of the trap assembly of FIG. 1 formed into a pod configuration.
Figure 16:
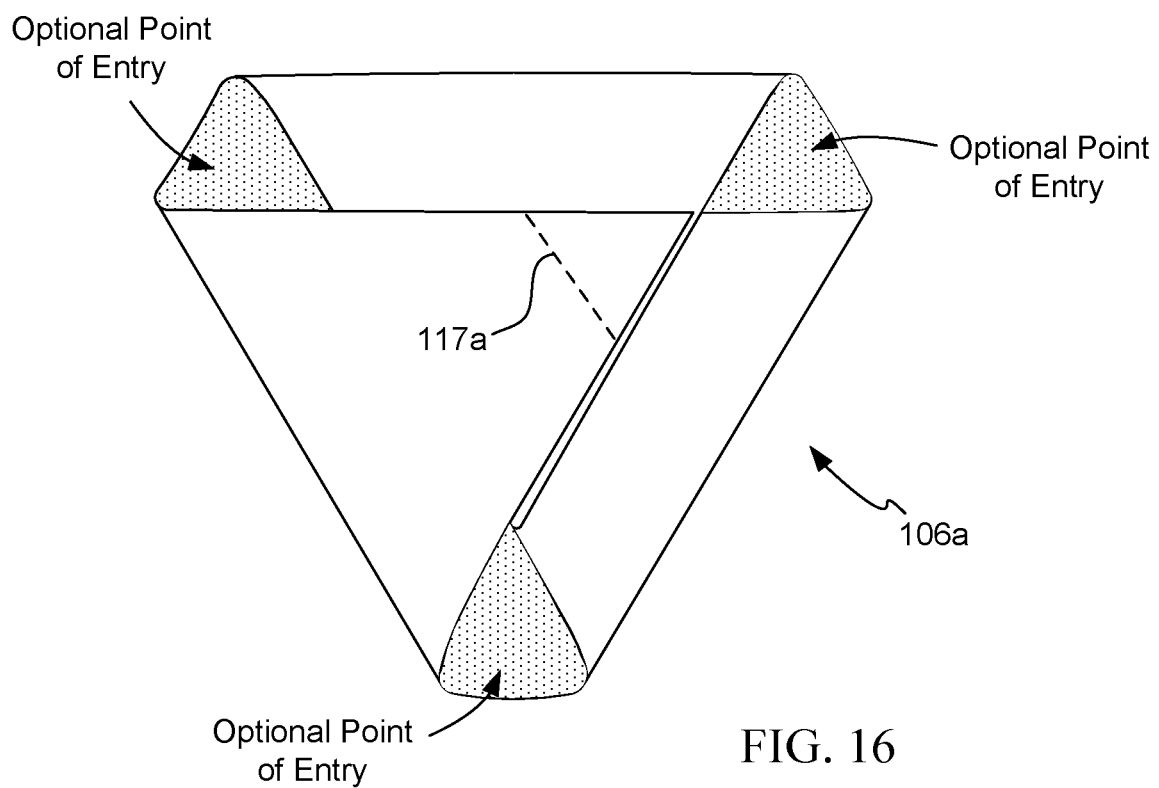
FIG. 16 is a rear view of the trap assembly of FIG. 15.

Referring now also to FIGS. 15 and 16 in the drawings, alternate views of assembly 101 are provided wherein section 106a is manipulated to form a pod shaped trap configuration. Like with the configuration of FIGS. 8-14, structure 103 and/or any section thereof may be manipulated to form a 3-dimensional body defining an interior volume. Whereas previously with FIGS. 8-14, the shape was conical having two portions or corners overlapping, the pod configuration of FIGS. 15 and 16 have more than 2 corners or portions overlapping. Layer 105 of the different portions or corners are brought into contact with face 109 and adhered to form the pod shape. A plurality of optional points of entry may be formed along the edges to permit pests to enter. The size of these optional points of entry are determined by the degree of overlap between corners. It is seen that this pod configuration is similar in form and function to that of the conical configuration of FIG. 8.

Figure 17:
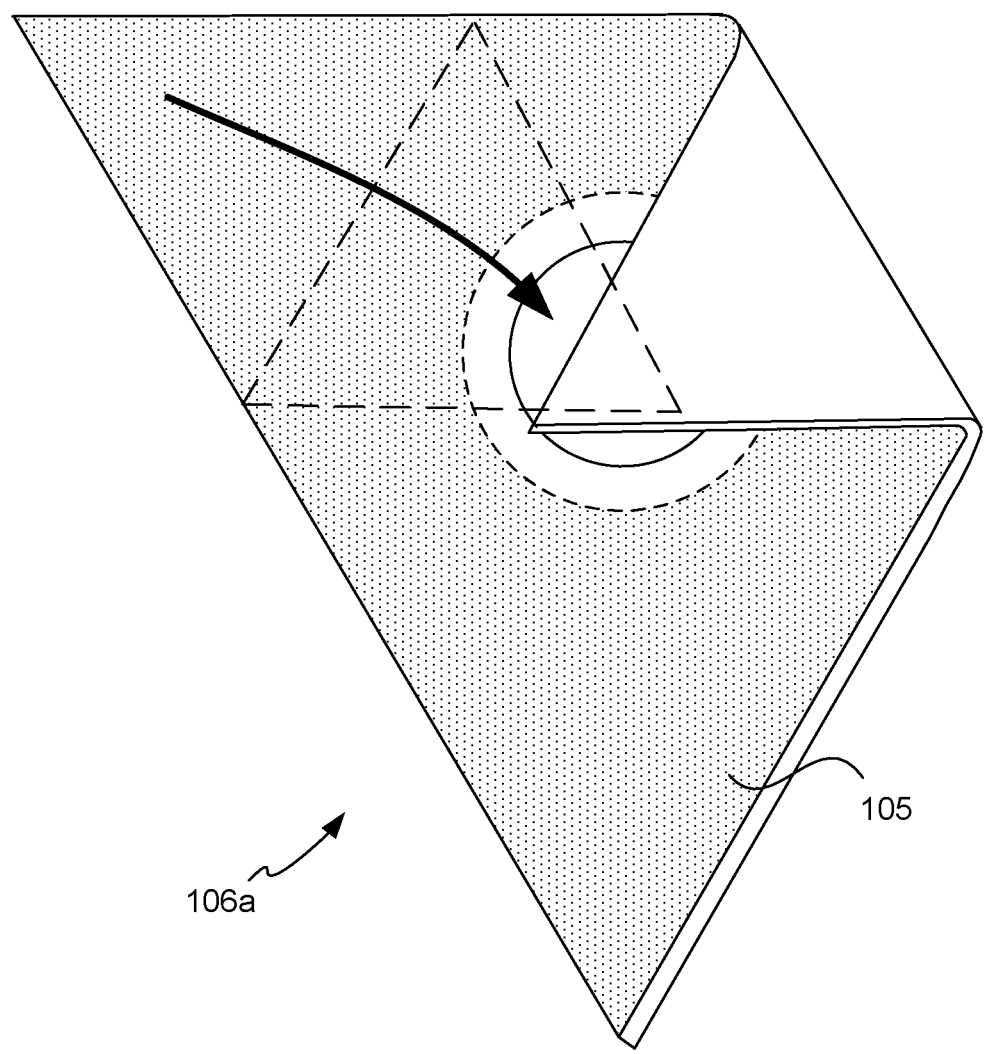
FIGS. 17-18 are rear views of the trap assembly of FIG. 1 illustrating the steps to form the trap assembly of FIG. 15.
Figure 18:
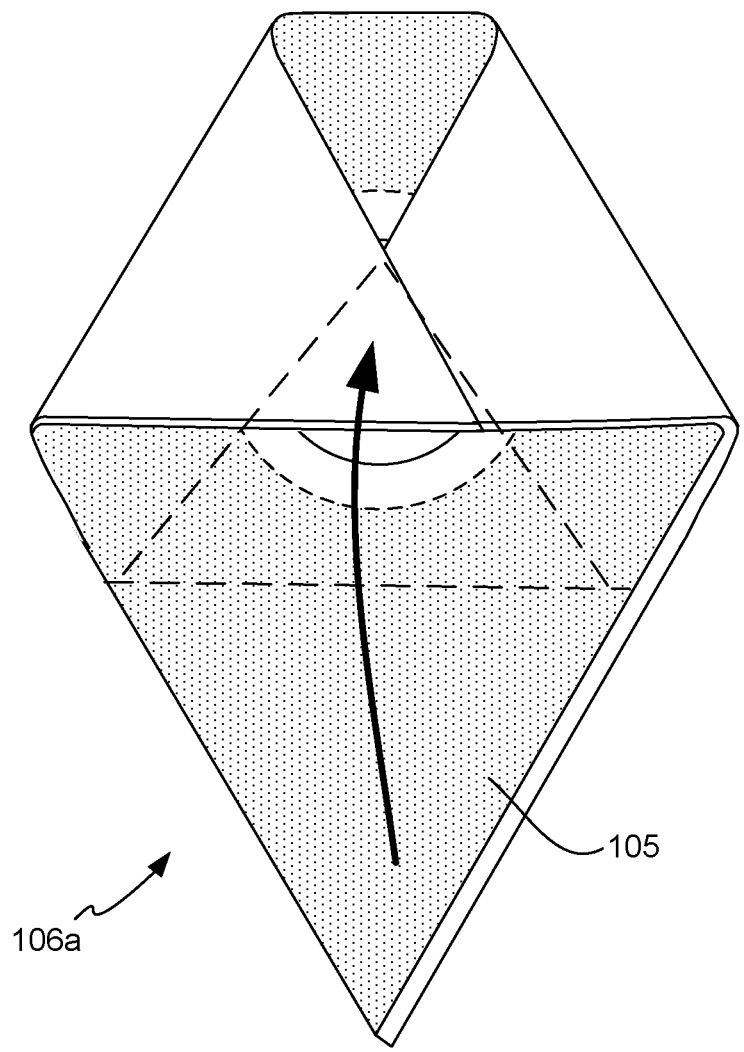

Referring to now also to FIGS. 17-18 in the drawings, rear views of section 106a are used to illustrate steps in forming the pod configuration. The first corner is illustrated in a folded over position in FIG. 17. The second corner is next to be folded over as indicated by the arrow. The third corner is then overlapped to any portion of the first two corners to create the pod shape shown in FIGS. 15 and 16.

Figure 19:
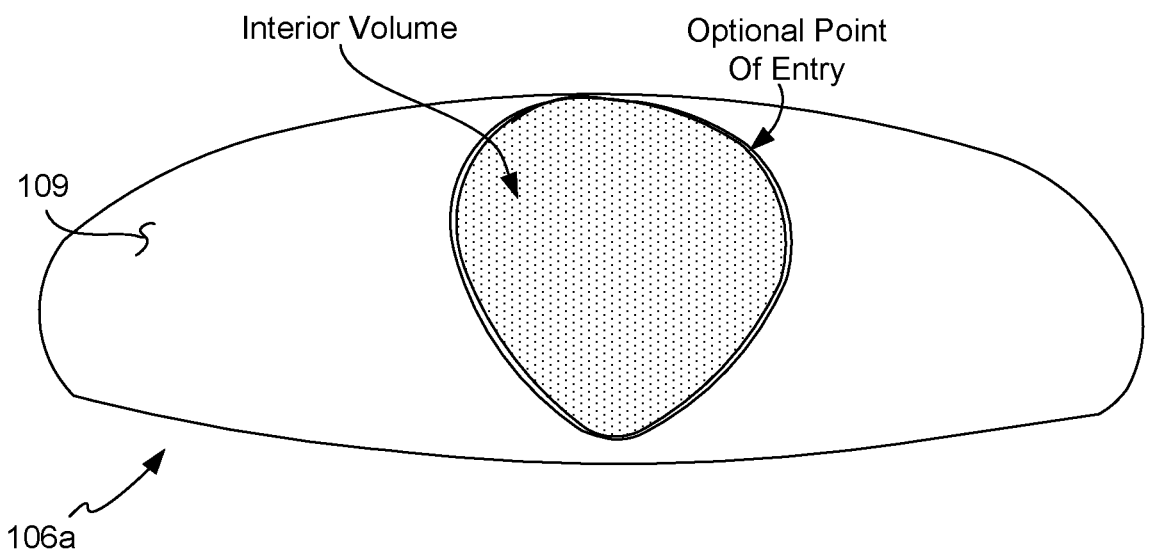
FIG. 19 is an end view of the trap assembly of FIG. 15.

Referring now also to FIG. 19 in the drawings, an end view of section 106a is the pod configuration is shown. An interior volume is defined as the area within the pod shape. Layer 105 is facing the interior volume of the pod shape in this embodiment. It is understood that portions of layer 105 may face outward from the conical shape in other embodiments.

Figure 20:
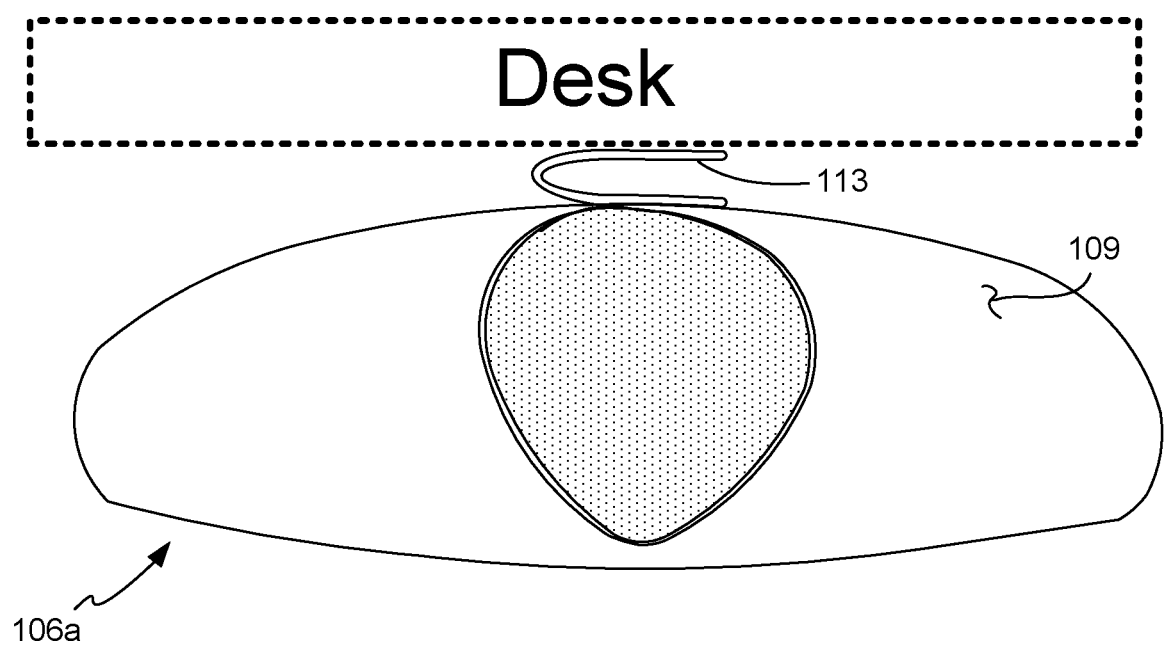
FIG. 20 is an alternate end view of the trap assembly of FIG. 19 supported from a desk.

Referring now also to FIG. 20 in the drawings, an alternate end view of sections 106a is shown wherein the pod configuration is supported from a lower surface of a desk. Hole member 113 may be optionally removed, and cover 107a may also be optionally removed. Aperture 115 creates an optional point of entry into the interior volume. Points of entry may also be created at the open ends wherein pests may enter. A hole member may be formed anywhere about the conical shape.

A user may use hole member 113, removing cover 107b, and fold it along a selected line to create a mount to hold the pod shape from a surface. This is seen in FIG. 20. Alternatively, a user may elect to create a fold line 117a, as seen from FIG. 16, to fold back a portion of the corner to create an exposed adhesive layer used to attach the pod to a surface. It is understood that any number of corners or portions of structure 103 may be used and overlapped. Whereas with the conical shape, the interior volume was defined by the overlapping of 2 sides, the pod shape interior volume is defined by the overlapping of 3 or more sides.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A method of capturing pests, comprising:
   obtaining a trap having a first face and a second face, the second face having an adhesive layer;
   removing at least a portion of a detachable film cover from the adhesive layer; and
   locating the trap on a surface with the first face in contact therewith the surface;
   wherein the trap assembly includes a plurality of sections selectively detachable from each other and the detachable film cover is separable with the plurality of sections such that the detachable film cover may be independently removed from each section both prior to separation and after separation.

2. The method of claim 1, further comprising:
   separating the trap assembly into the plurality of sections permitting use in multiple locations.

3. The method of claim 2, further comprising:
   locating at least one of the plurality of sections across an interior corner so as to create a void space between the corner and the adhesive layer.

4. The method of claim 3, further comprising:
   forming an entry point within the at least one of the plurality of sections for a pest to pass from the first face to the second face to reach the void space, the entry point being a gap in a portion of the at least one of the plurality of sections.

5. The method of claim 1, wherein a first section of the plurality of sections is a main body, the main body includes a hole member.

6. The method of claim 5, wherein the hole member is covered by the detachable film cover.

7. The method of claim 1, further comprising:
   attaching a portion of the first face to a portion of the second face to form a conical shape.

8. The method of claim 1, further comprising:
   removing a hole member from an interior area of the trap to form an aperture.

9. The method of claim 1, further comprising:
detaching a first section from the trap; and forming a portion of the first section into a cone;
wherein the cone is formed by adhering a portion of the first face to a portion of the second face of the first section.

10. The method of claim 9, further comprising:
removing a hole member from an interior area of the trap to form an aperture.

11. The method of claim 10, further comprising:
retaining a portion of the detachable film cover adjacent the aperture,
wherein the hole member is covered by the detachable film cover.

12. The method of claim 1, wherein the trap includes a main body having a plurality of corners, a plurality of the corners are overlaid upon each other to form an interior volume.

13. The method of claim 12, wherein the interior volume is enclosed on at least 3 sides.

14. The method of claim 12, wherein the interior volume is enclosed on at least 2 sides.

15. The method of claim 12, wherein access to the interior volume is permitted from an edge of the main body.

16. The method of claim 12, further comprising:
removing a hole member from an internal area of the main body to permit access to the interior volume, removal of the hole member forms an aperture in the main body.

17. The method of claim 16, further comprising:
retaining a portion of the detachable film cover adjacent the aperture,
wherein the hole member is covered by the detachable film cover.

18. The method of claim 12, further comprising:
retaining a portion of the detachable film cover on the second face.

* * * * *